United States Patent
Colombo et al.

(10) Patent No.: US 8,574,388 B2
(45) Date of Patent: Nov. 5, 2013

(54) METHOD AND DEVICE FOR THE AUTOMATED MANUFACTURE OF AT LEAST ONE ELONGATE COMPOSITE MATERIAL PART WITH ONE OR MORE LAYERS

(75) Inventors: Denis Colombo, Sanary sur Mer (FR); Pierre Valibouse, Le Revest (FR); Dominique Mailhot, La Seyne sur Mer (FR); Dominique Micheaux, Sanary sur Mer (FR)

(73) Assignee: Constructions Industrielles de la Mediteranee-CNIM, Paris (FR)

( * ) Notice: Subject to any disclaimer, the term of this patent is extended or adjusted under 35 U.S.C. 154(b) by 98 days.

(21) Appl. No.: 13/254,586

(22) PCT Filed: Mar. 5, 2010

(86) PCT No.: PCT/FR2010/050381
§ 371 (c)(1),
(2), (4) Date: Sep. 23, 2011

(87) PCT Pub. No.: WO2010/100386
PCT Pub. Date: Sep. 10, 2010

(65) Prior Publication Data
US 2012/0006475 A1 Jan. 12, 2012

(30) Foreign Application Priority Data

Mar. 5, 2009 (FR) ...................................... 09 51395

(51) Int. Cl.
*B29C 70/38* (2006.01)
(52) U.S. Cl.
USPC .......................................... 156/243; 156/351
(58) Field of Classification Search
USPC ........................................................ 156/243
See application file for complete search history.

(56) References Cited

U.S. PATENT DOCUMENTS

| | | | |
|---|---|---|---|
| 7,083,698 B2 * | 8/2006 | Engwall et al. | 156/175 |
| 2005/0023728 A1 | 2/2005 | Benson et al. | |
| 2007/0289699 A1 * | 12/2007 | Benson et al. | 156/180 |
| 2011/0240213 A1 * | 10/2011 | Barlag et al. | 156/243 |

FOREIGN PATENT DOCUMENTS

| | | | |
|---|---|---|---|
| EP | 1 504 880 A1 | | 2/2005 |
| EP | 1504880 A1 * | | 2/2005 |
| EP | 1 894 706 A1 | | 3/2008 |

OTHER PUBLICATIONS

European Patent Office, International Search Report in International Patent Application No. PCT/FR2010/050381 (Nov. 19, 2010).

* cited by examiner

*Primary Examiner* — Philip Tucker
*Assistant Examiner* — Vicki Wu
(74) *Attorney, Agent, or Firm* — Leydig, Voit & Mayer, Ltd.

(57) ABSTRACT

A method and device for automated manufacture of an elongated composite material part having at least one layer. The method includes depositing, by unrolling onto a mold, in a first direction, along the mold, an assembly having a composite material layer separably attached to a substrate tape, and forming and compacting part of the assembly onto the mold in the first direction. The assembly is partially shaped to the shape of the mold, and then a remaining portion of the assembly is formed and compacted in a second direction, opposite the first direction, to shape the assembly completely to the shape of the mold. Then the assembly is separated, by peeling the substrate tape from the composite material layer that is secured to the mold, by unrolling the substrate tape in the second direction.

23 Claims, 7 Drawing Sheets

| Phase | Robot 16 | Robot 21 | Robot 22 | Robot 23 | Robot 24 |
|---|---|---|---|---|---|
| B. Forward Movement | B1, RS, 49, RM | B2, 33, RS, RM | B3, RS, RM, 33 | B4, 33, RS, RM | B5, 33, RS, RM |
| | | | 01. Passage order of robots → | | |
| C. First Tool Change | No change of spool 35 | Change of tool 33 | Change of tool 33 | Change of tool 33 | Change of tool 33 |
| D. Return Movement | RM | 33, RS, RM | RS, 33, RM | RM, RS | RS, RM, 33 |
| | | | ← 02. Passage order of robots | | |
| E. Second Tool Change | Change of spool 35 | Change of tool 33 | Change of tool 33 | Change of tool 33 | Change of tool 33 |

Fig. 7

METHOD AND DEVICE FOR THE AUTOMATED MANUFACTURE OF AT LEAST ONE ELONGATE COMPOSITE MATERIAL PART WITH ONE OR MORE LAYERS

FIELD OF THE INVENTION

The present invention relates to a method and device for the manufacture of elongate structural parts from composite materials.

DESCRIPTION OF THE RELATED ART

Elongate structural parts can have variable geometries and their section, whether constant or variable, can assume several shapes, for example hat, C, T, I, L, or Z shapes or others, and can be used as stiffeners in the aeronautics field.

Several techniques are currently used to manufacture this type of part.

The most common technique uses manual drape molding consisting of manually placing several plies or layers of a composite material on a mold having the desired geometry. Aside from the slowness of the drape molding method, due to the deposition by hand of different layers on the mold, this known technique also requires intermediate compacting operations of the deposited layers so as to evacuate the air captured in the different layers. Such compacting operations are done by placing the part to be made under a tank in which a vacuum is formed. These intermediate compacting operations increase the slowness of the manual drape molding technique and therefore make it incompatible with the manufacture of structural composite material parts at high industrial rhythms.

A solution to this problem has already been sought by developing several automatic manufacturing techniques for structural composite material parts.

One of these techniques is pultrusion, which consists of pulling resin-impregnated fibers through a die mold where the shaping and reticulation of the layers of the parts to be made is done. This technique is limited in that it is very difficult to obtain an orientation of the fibers of the layers of composite materials that is different from their primary direction and in that it does not allow the manufacture of curved pieces.

Another known technique consists of using hot drape forming machines for the aeronautics sector making it possible to drape the plies or layers of the part to be made on a planar surface before hot forming them in a press. The limitations of this known technique are essentially related to the length of the parts to be made, as it is necessary to use a press having the length of those parts.

Another technique, for example described in patent application WO 2005/011961, uses a machine making it possible to shape and compact straight or slightly curved stiffeners without a size limitation, but such a machine has an extremely complex, costly structure lacking flexibility. For example, in the aeronautics field, the formation of a batch of several stiffeners for an airplane requires a very large number of parts with very different geometries and the machine described in patent application WO 2005/011961 does not resolve this problem.

SUMMARY OF THE INVENTION

The invention aims to offset the aforementioned drawbacks of the different known techniques by proposing a flexible industrial tool that can adapt to the manufacture of a wide variety of structural composite material parts and compatible with high industrial rhythms.

To that end, according to the invention, the method for the automated manufacture of at least one elongate composite material part with one or more layers from an elongate mold having a shape complementary to that of the part to be made is characterized in that it consists of a) depositing, by unrolling onto the elongate mold in a first predetermined direction along the mold, a first composite material layer attached to a substrate tape that is separable from the first layer, b) forming and compacting part of the assembly of the substrate tape and first composite material layer onto the mold in the first direction so as to partially shape it to the shape of the mold, c) forming and compacting the remaining portion of the assembly deposited along the mold of substrate tape and composite material first layer in a second direction opposite the first direction so as to shape it completely to the shape of the mold and separating, by peeling, the substrate tape from the composite material first layer that is secured to the mold by re-rolling the substrate tape again in the second direction.

The method consists of forming and compacting the portion of the assembly of the substrate tape and first composite material layer on the mold by passing over this assembly, in the first direction, at least one compacting tool, such as a roller or wheel, with a shape partially complementary to that of the mold and forming and compacting the remaining portion of the assembly of the substrate tape and first composite material layer on the mold by automatically replacing each compacting tool with another compacting tool, such as a roller or a wheel, of another shape partially complementary to that of the mold and passing the other compacting tool over this assembly in the second direction.

The method consists of unwinding the assembly of the substrate tape and first composite material layer from a spool removably fastened to a draping head during the relative movement between the draping head and the mold in the first direction, the head having a roller for applying this assembly on the mold and re-winding the substrate tape on the spool during the relative movement of the draping head and the mold in the second direction.

Before placing another assembly of substrate tape and second composite material layer on the first composite material layer integral with the mold attached to the tape, the method consists of automatically replacing the preceding spool of the draping head on which the preceding tape has been rewound with another spool on which the substrate tape and the second composite material layer are wound, automatically replacing the other compacting tool with the preceding one and repeating the different aforementioned steps a) to c) to deposit the other assembly of the substrate tape and second composite material layer on the first composite material layer of the mold and forming and compacting the assembly to mold it completely to the shape of the mold.

Preferably, the mold is heated before performing the aforementioned steps a) to c).

Advantageously, the mold is displaced longitudinally under a fixed gantry supporting at least two controlled actuators spatially displaceable with several degrees of freedom and one of which is equipped with the draping head and the other of which is equipped with the compacting tool removably fixed to the actuator and used to form and compact each assembly of the substrate tape and composite material layer on the mold in the first direction and which can be replaced by another compacting tool before using it to form and compact the assembly of the substrate tape and composite material layer on the mold in the second direction.

The actuator equipped with the draping head can be moved toward a carrousel to automatically deposit a spool thereon on which a substrate tape is rewound and to selectively withdraw one of the spools carried by the carrousel on which assemblies of substrate tape and layers of composite material are respectively wound.

Advantageously, the actuators consist of robots.

The composite material layer attached to the substrate tape of each assembly is precut to a length substantially equal to that of the elongate mold.

The mold is, in transverse section in the shape of a T, a hat, a C, I, L or Z.

The method consists of sequentially controlling, in a synchronized manner through a digital controller, the different deposition, formation, and compacting steps for each assembly of substrate tape and composite material layer, the changes of compacting tool and spool of the draping head and the displacement of the mold relative to the draping head and the compacting tools.

The invention also relates to a device for the automated manufacture of at least one elongate composite material part with one or more layers and characterized in that it comprises:

a table on which an elongate mold is positioned having a shape complementary to that of each piece to be made, a gantry supporting at least two actuators controlled with several spatial degrees of freedom, one of the actuators being equipped with a draping head making it possible to deposit a layer of a composite material attached to a substrate tape separable from the composite material layer on the mold and the other actuator being equipped with a compacting tool, such as a roller or a wheel, removably fixed to the actuator and intended to form and compact part of the assembly of the substrate tape and composite material layer deposited on the mold, and means allowing a relative guided displacement between the table equipped with its mold and the gantry in a longitudinal direction of the mold, the actuator with the compacting tool being able to be controlled to change the compacting tool for another, different compacting tool after formation and compacting of the portion of the assembly of the tape and composite material layer on the mold by relative displacement between the mold and the compacting tool in a first direction and before relative displacement between the mold and the other compacting tool in a second direction opposite the first direction to form and compact the remaining portion of the assembly of the substrate tape and composite material layer on the mold.

Preferably, the draping head comprises a spool removably fixed to the head and that can be rotated in either direction by a controlled motor, on which spool an assembly of the substrate tape and composite material layer is wound that can be unwound from the spool when it is rotated in a particular direction by the motor, and a roller making it possible to apply and deposit the assembly on the mold when it is unwound from the spool and when the table is moved relative to the gantry in the first direction, the spool being able to be rotated in the opposite direction by the motor to rewind the substrate tape and separate it from the composite material layer deposited on the mold when the table is displaced relative to the gantry in the second direction.

The draping head also comprises, arranged near the spool, a hollow plate forming a guide corridor for the assembly of the substrate tape and composite material layer toward the application roller during the displacement of the assembly of the spool or the substrate tape toward the spool during rewinding of the tape, and two knurled motorized guide rollers arranged between the guide plate and the application roller.

Advantageously, the guide plate is in the form of a funnel whereof the large opening is adjacent to the spool and is pivotably mounted controlled by a motor relative to the draping head between a released position allowing a spool to be fastened to the head and its guide position.

The device also comprises, situated near the gantry, a storage carrousel for spools, on each of which an assembly of the substrate tape and composite material layer is wound beforehand, and the draping head actuator can be controlled to grasp and removably fix a selected one of the spools from the carrousel to the draping head.

The means for removably fastening a spool to the draping head comprise a tapered nozzle integral with a support axis of the spool and a tapered spindle rotatably mounted to the draping head on command by a motor and in which the tapered spindle can be removably coupled.

The device also comprises two storage and compacting tool units situated near each end of the gantry and each compacting tool actuator can be controlled to automatically deposit a compacting tool at one of the storage units and to grasp another compacting tool in the unit.

Preferably, the displacement means make it possible to displace the table and its mold in guided translation under the fixed gantry in the longitudinal direction of the mold.

These displacement means advantageously comprise a motorized pinion integral with the table meshing on a fixed rack extending parallel to the longitudinal direction of the elongate mold and at least one fixed guide rail parallel to the rack and on which the support table of the mold can move.

The table supports a heating plate on which the elongate mold is arranged.

The actuators are formed by robots with articulated wrists carrying the draping head and the compacting tools.

The device preferably comprises a digital controller making it possible to control the draping head and compacting tool actuators in a synchronized and coordinated manner, the relative displacements between the support table of the elongate mold and the gantry, the changes of compacting tools and spools of the draping head and the motors rotating the spool of the draping head in the winding and unwinding directions, pivoting the guide plate and the knurled guide rollers of the head.

BRIEF DESCRIPTION OF THE DRAWINGS

The invention will be better understood, and other aims, features, details and advantages thereof will appear more clearly in the following explanatory description, done in reference to the appended drawings provided solely as an example illustrating one embodiment of the invention and in which.

DETAILED DESCRIPTION

The device according to the invention will be described in the automated manufacture of straight composite material stiffeners with a hat-shaped section for airplanes, but it can of course apply to the manufacture of structural composite material parts used in fields other than aeronautics and having curved shapes and other profiles, for example in the shape of a C, T, I, L or Z.

Each stiffener is made by automatically depositing one or more layers of fibers on a mold from a composite tape made up of fiber elements, for example carbon-based, adhered by impregnation of a thermosetting or thermoplastic resin and attached to a paper or plastic film substrate tape.

In reference to the figures, the inventive device comprises an elongate table 1 on which a heating plate 2 is mounted extending over practically the entire length of the table.

An elongate mold 3 having a shape in transverse cross-section complementary to that of the stiffener to be made in a hat shape is fixed on the heating plate 2 along the length thereof.

The table 1 is arranged horizontally and has a plurality of pairs of support feet 4, regularly spaced along the table 1 which can be moved precisely in straight translation in its longitudinal direction by any suitable means.

As shown, the means for moving the table 1 comprise a rack 5 fixed to the ground under the table 1 and a pinion 6 carried by the table 1 while meshing on the rack 5.

Figure 1:
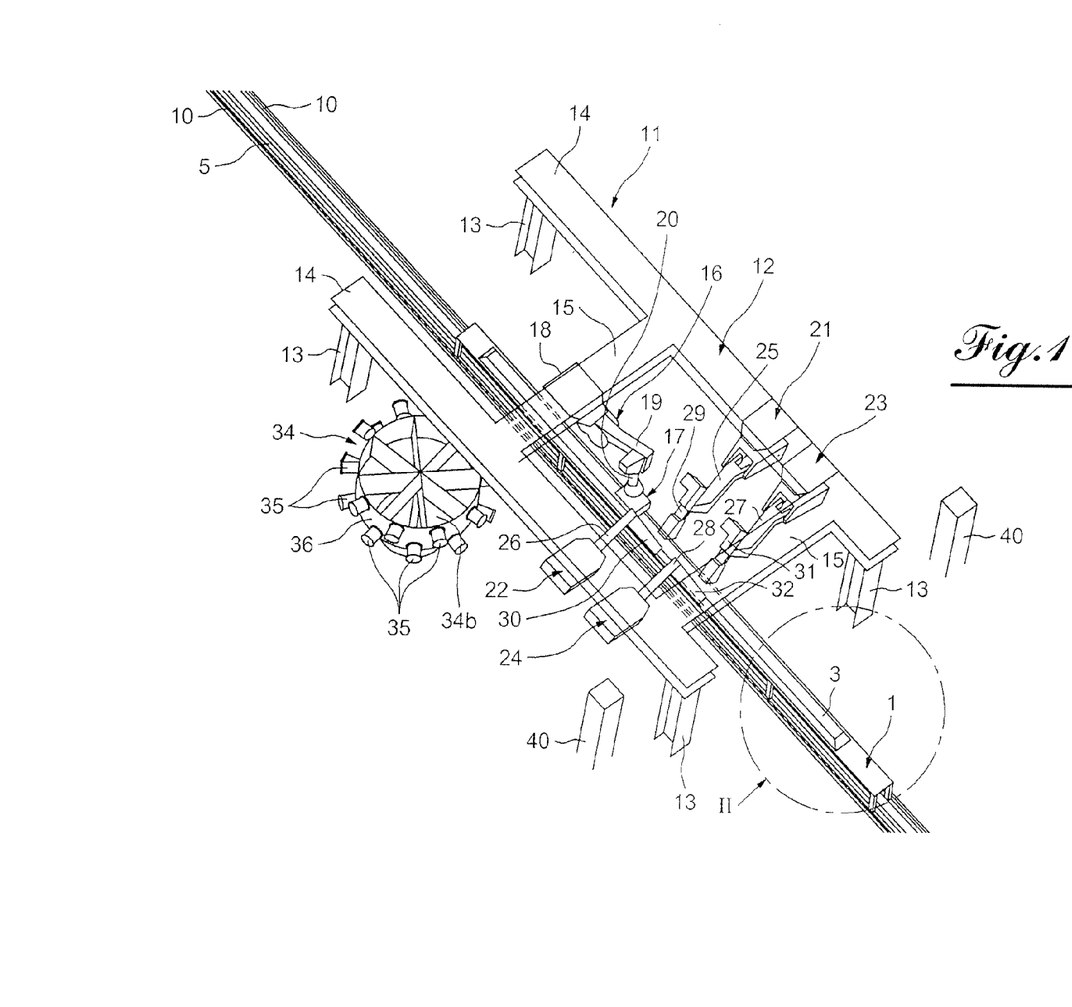
FIG. 1 is a perspective top view of the inventive device enabling the automated manufacture of rigid elongate composite material parts.
Figure 2:
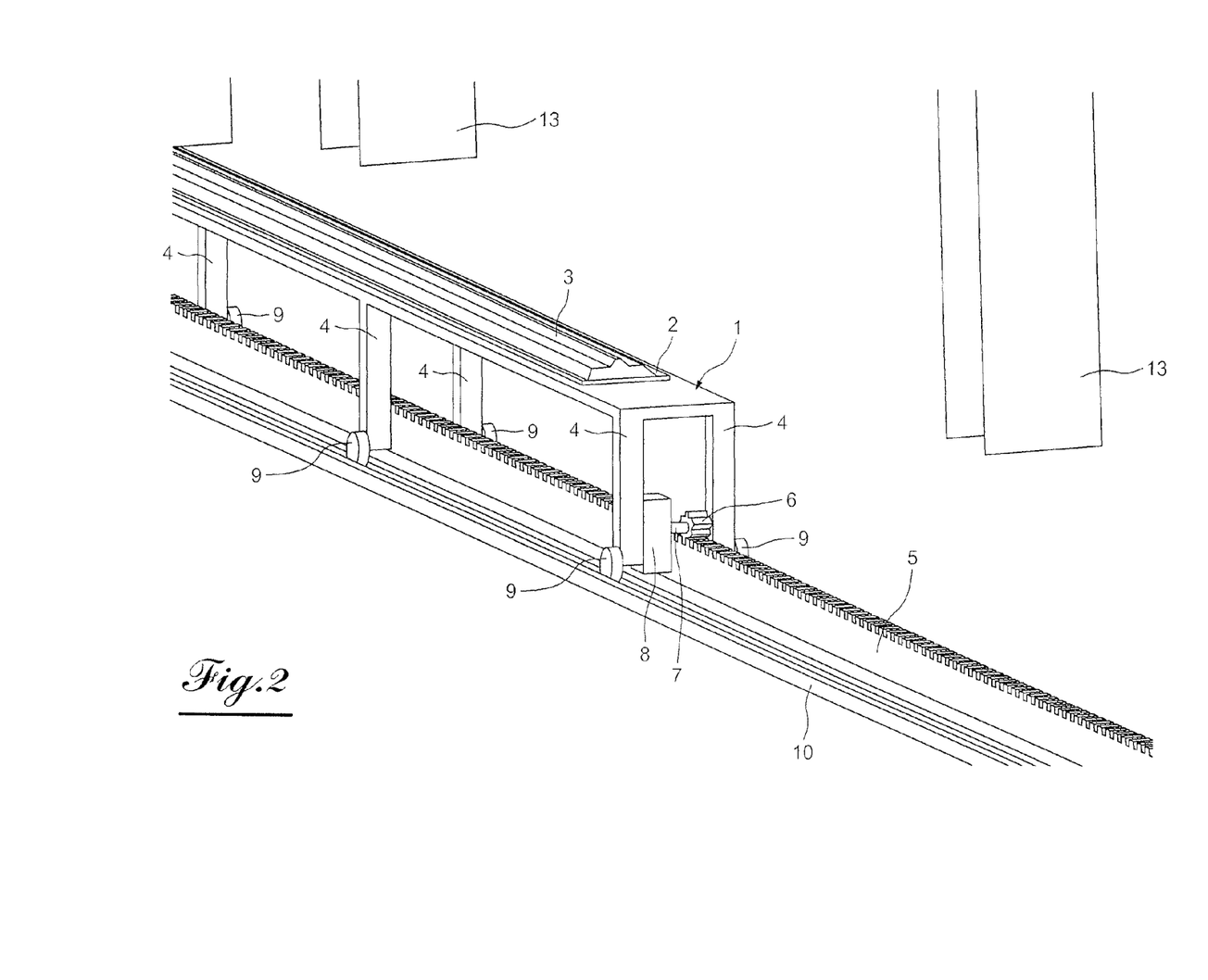
FIG. 2 is an enlarged perspective view of the part circled in II in FIG. 1 and showing the means for displacing the support table of the mold for making a part.
Figure 3:
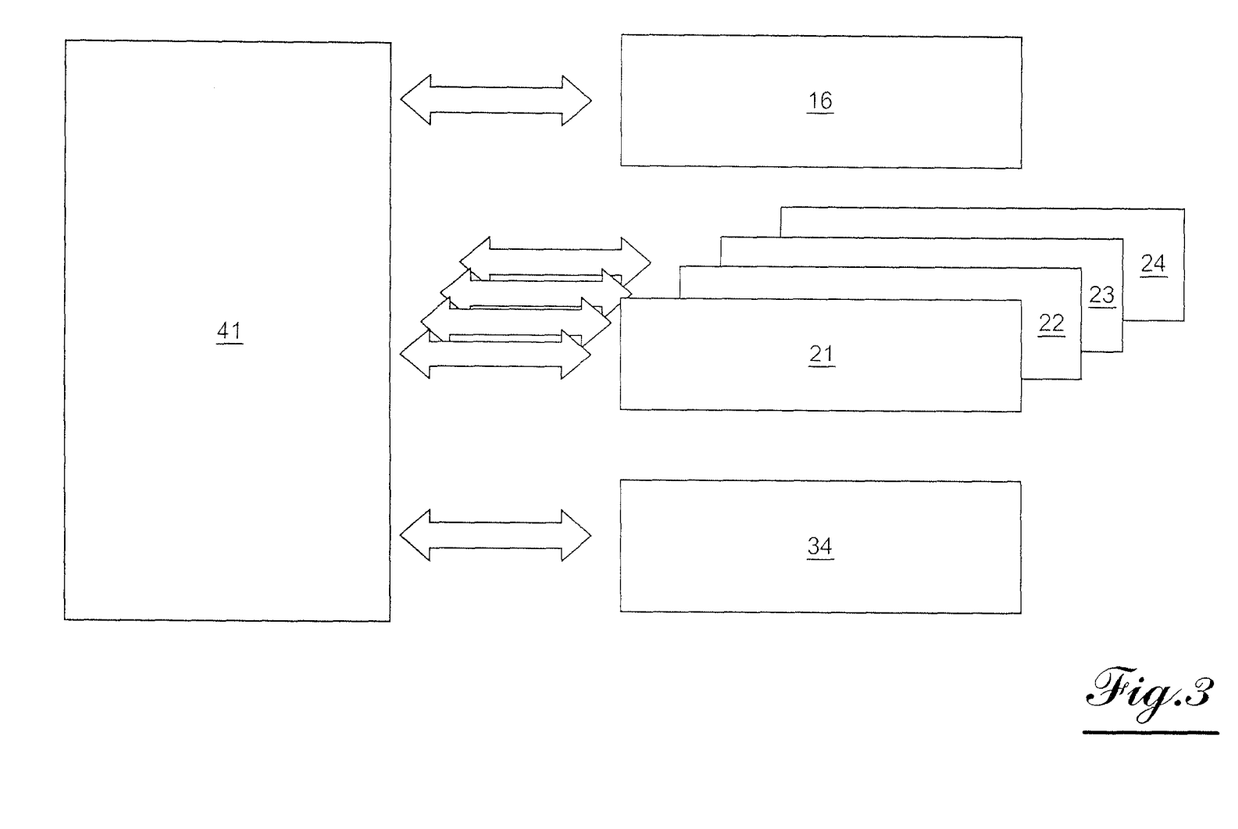
FIG. 3 is a diagrammatic view of the digital controller used to control the different elements equipping the device of FIG. 1 in a sequential and synchronized manner.
Figure 4:
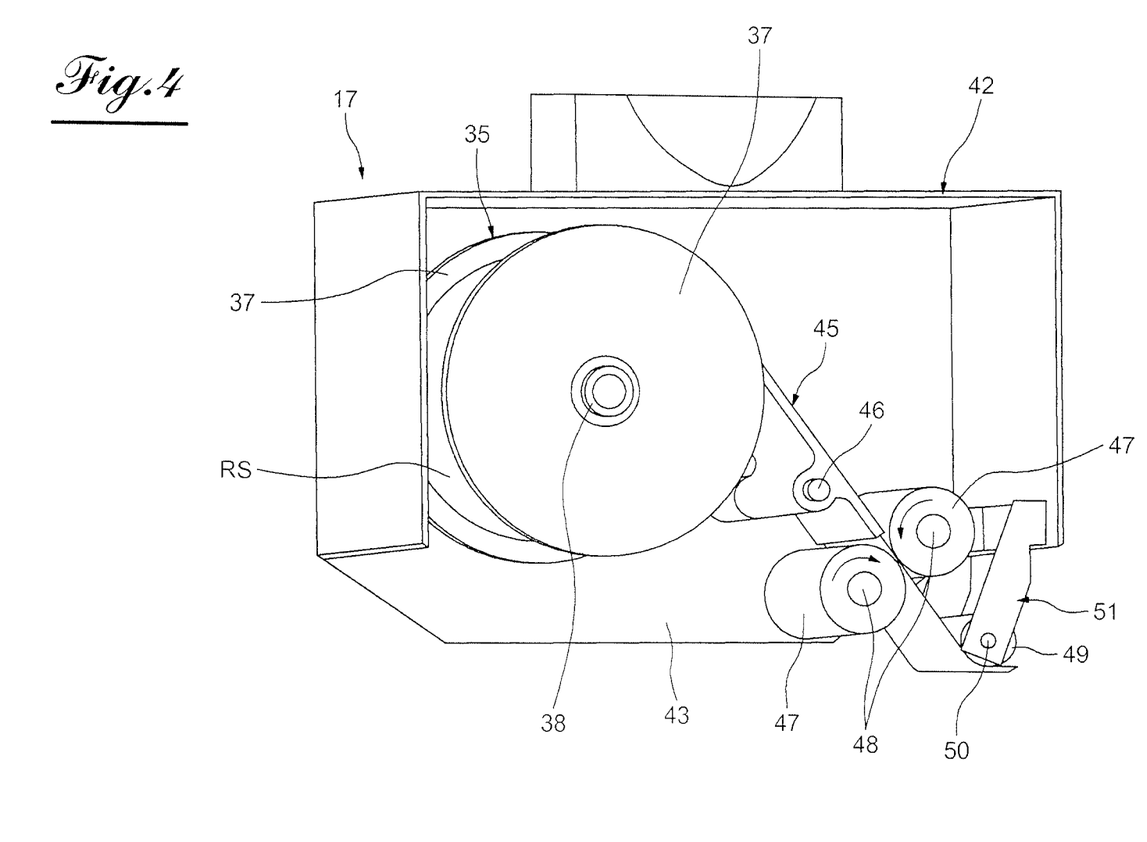
FIG. 4 is an enlarged perspective view of a draping head according to the invention.

The pinion 6 is carried by a shaft 7 secured to the drive shaft of an electric motor 8 fixed to the table 1. As better shown by FIG. 2, the electric motor is secured to a foot 4 of one of the pairs, in the present case the front pair of the table 1. However, the pinion 6 and electric motor 8 assembly can be fixed to one of the other pairs of support feet 4 of the table 1.

The support feet 4 of each pair include, at each of their ends, a vertical wheel 9 mounted freely rotating around a horizontal axis secured to the foot. The two wheels of each pair of feet 4 are respectively mounted in two guide rails 10 secured to the ground while being arranged on either side of the rack 5 parallel thereto. Each guide rail 10 can be formed by a profile with a U-shaped transverse section opening upward.

The rack 5 and the guide rails 10 have a length greater than that of the table 1 so as to extend beyond the table 1 at each of its ends.

The inventive device also comprises a fixed gantry 11 arranged above the rack 5 and rails 10 and which supports several actuators, such as robots, having one or more degrees of spatial freedom and which will be described later.

The gantry 11 comprises a horizontal upper structure 12 carrying the different actuators and vertical support feet 13 of the structure 12 fixed to the ground.

The structure 12 of the gantry 11 can be formed by two beams 14 extending parallel to the guide rails 10 on either side thereof and at least two crossbeams 15 arranged between the two beams 14 perpendicular thereto. In the present case there are four support feet 13, which are fixed to each of the ends of the beams 14 of the support structure 12.

The gantry 11 supports a first robot 16 equipped with a draping head 17 intended to deposit several layers of composite materials and which is fixed under one of the crossbeams 15 of the structure 12. The robot 16 comprises a body 18 fixed to the crossbeam 15 and a mobile arm 19 with an end wrist 20 carrying the draping head 17. The articulations of the arm 19 and the wrist 20 of the robot 16 are such that the draping head can be displaced in any spatial direction so as to position the draping head 17 precisely relative to the elongate mold 3 to deposit different composite material layers on the latter constituting the stiffener to be made.

The gantry 11 also carries several other robots 21-24, for example four, which can be equipped with removable tools to form and compact composite material layers along the elongate mold 3. Each robot 21-24 comprises an articulated arm 25-28 with wrists 29-32 carrying a forming and compacting tool for composite material layers, each tool being removably fixed to the end of the corresponding wrist of the robot 21-24 in order to be replaced by another, different forming and compacting tool as will be seen later. The articulations of the wrists and arms of the robots 21-24 are such that they allow the forming and compacting tools 33 they carry several degrees of spatial freedom, enabling the tools to be positioned relative to certain portions of the elongate mold 3.

The means making it possible to removably fix each forming and compacting tool 33 to the corresponding wrist of the robot 21-24 are known in themselves in the field of robotics and do not need to be described in detail.

Each compacting tool 33 is known in itself and can be formed by a roller, a wheel, a brush or a skate.

The inventive device also comprises a carrousel 34 on which spools 35 are stored, on each of which spools a layer or assembly of substrate tape RS is wound to which a pre-impregnated material tape RM is attached to form a composite material layer of the stiffener.

The carrousel 34 can for example be made up of a horizontal wheel 36 with spokes that can be rotated around a vertical axis by an electric motor, not shown, and the different spools are removably fixed to the peripheral outer face of the wheel 36. As better emerges from FIGS. 6A to 6E, the wheel 36 of the carrousel 34 is rotatably mounted on a vertical foot 34a fixed to the ground via a base 34b.

Figure 5:
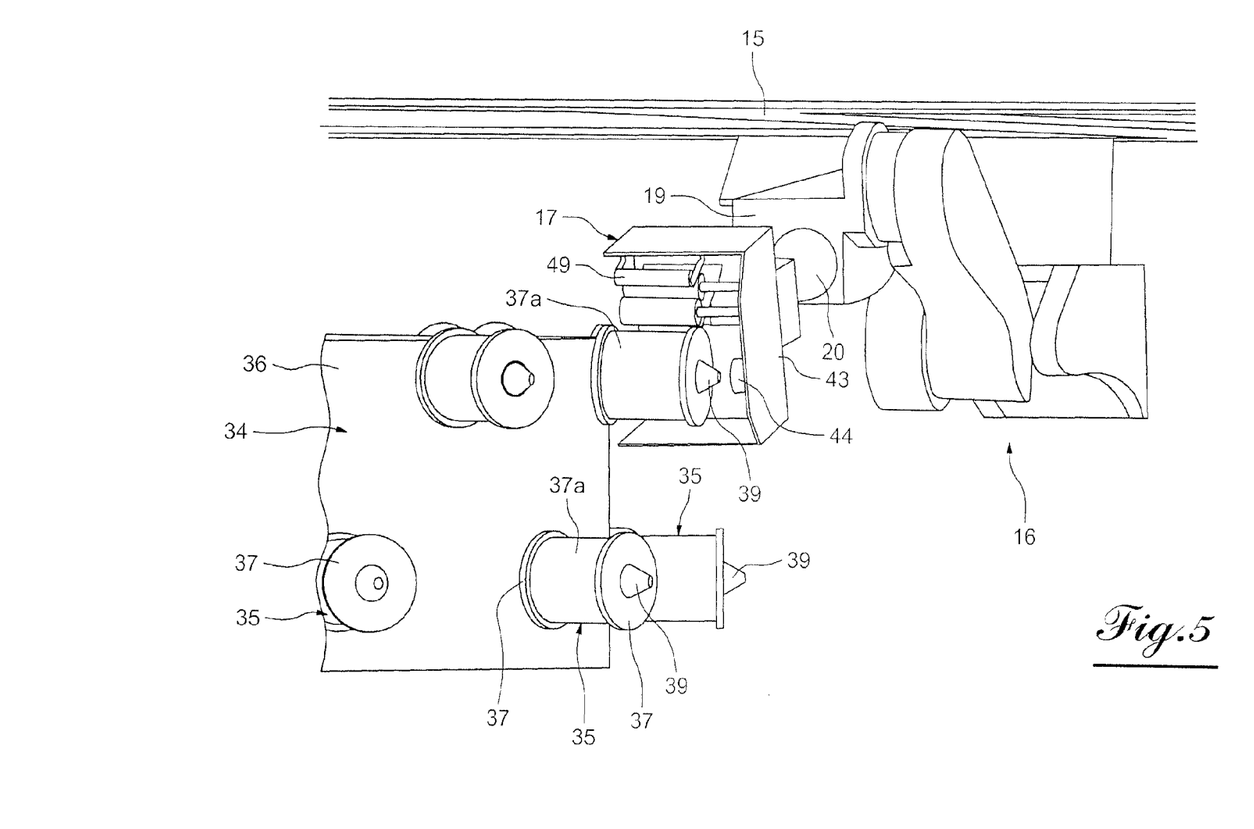
FIG. 5 is a perspective view showing a spool change of the draping head of FIG. 4 carried by a robot arm.

Each spool 35 is removably fixed to the wheel 36 by any suitable means. For example, each spool 35 can be slipped with little play on a cylindrical axis, not shown, integral with the wheel 36 while making the latter protrude radially so that the spool can be removed by gripped sliding off the axis. Each spool 35 has a cylindrical hub 37a and two parallel circular flanges 37 fixed to the ends of the hub 36. Furthermore, each spool 35 is secured to a hollow shaft 38 whereof one end has a tapered nozzle 39 and the opposite end of which allows the spool 35 to be slipped on its corresponding support axis of the wheel 36 of the carrousel 34. As shown in FIG. 5, in the storage position of the spools 35 on the carrousel 34, the tapered ends 39 of the hollow shaft 38 protrude outwardly from the corresponding flange 37 of the spool and are therefore outwardly accessible to the carrousel 34.

The robot 16 can be controlled to allow the draping head 17 to deposit, on the carrousel 34, a spool 35 on which only the substrate tape RS is wound without its material tape RM and to grasp another spool on which an assembly of the substrate tape RS and material tape RM is wound for a new deposition sequence of a material ply on the elongate mold 3.

The inventive device also comprises two units 40 preferably situated at two ends of a same side of the gantry 11 and on each of which forming and compacting tools 33 of different shapes and complementary to some of the portions of the elongate mold 3 are stored. The robots 21 to 24 can be controlled during the different forming and compacting sequence of the material tapes RM on the elongate mold 3 to deposit the forming and compacting tools 33 previously used on the appropriate unit 40 and grasp new forming and compacting tools 33 to perform a new forming and compacting operation of the material tapes RM on the corresponding portion of the elongate mold 3.

The inventive device lastly comprises a digital controller 41 that can be formed by a computer device and that makes it possible to make in particular the operation of the different robots 16, 21-24 and the movements of the table 1 relative to the fixed gantry 11 and the carrousel 34 occur in a synchronized and coordinated manner to produce a stiffener. Thus, the digital controller 41 is programmed specifically for each type of stiffener to be produced.

The draping head 17 comprises a case or body 42 with a general parallelepiped shape partially open to allow a spool 35 to be removed from the head after deposition and compacting of the material tape RM on the elongate mold 3 and replacement thereof by a new substrate tape RS and material tape RM spool to deposit a new ply of composite material on the ply previously deposited and compacted on the mold 3.

To that end, one 43 of the walls of the case 42 of the draping head 17 has an inwardly tapered spindle 44 with a shape complementary to that of the nozzle 39 of the spool 35 and that is rotatably mounted relative to the case 42 by an electric motor, not shown, able to be secured to the case 42 of the draping head 17. In this way, when the robot 16 is controlled to arrange the draping head 17 so that the tapered spindle 34 is opposite a tapered nozzle 39 of a selected spool 35, the arm 19 of the robot 16 is displaced to introduce the tapered nozzle 39 of the spool 35 into the spindle 44 so as to removably couple the spool 35 in the case 42 of the draping head 17. The spool 35 can then be rotated in one direction or the opposite direction by the associated electric motor to unwind the assembly of the substrate tape RS and composite material tape RM from the spool 35 on the elongate mold 3 along the latter and rewind only the substrate tape RS on the spool 35, as will be described later.

In the case 42 of the draping head 17, a hollow plate 45 is also fixed that can tilt under the control of an electric motor, not shown, which can be secured to the case 42, around an axis 46 secured to the inner face of the wall 43 perpendicular thereto. Thus, the plate 45 can pivot between a position released from the spool 35 to allow it to be removed from the draping head 17 and the fastening of another spool 35 to the head, and its position forming a guide corridor.

The hollow mobile plate 45 preferably assumes the shape of a funnel whereof the large opening with a rectangular transverse section is adjacent to the spool 35 while being arranged between the two flanges 37 of the spool and the opposite small opening with a rectangular transverse section is situated opposite the two parallel knurled rollers 47 carried by two axes 48 secured to the inner face of the wall 43 of the case 42 and able to be rotated by an electric motor (not shown) so as to drive the two knurled rollers 47 in opposite directions.

The case 42 of the draping head 17 also comprises a roller 49 for applying the assembly of the substrate tape RS and composite material tape RM on the elongate mold 3 or on a composite material layer previously deposited on the mold and which is situated near the two knurled rollers 47 opposite the pivoting plate 45. The application roller 49 is mounted loose on an axis 50 fixed to a yoke 51 secured to one of the walls of the case 42 perpendicular to the wall 43 so that the roller extends parallel to the two knurled guide rollers 47.

The hollow plate 45 serves as a guide corridor either for the assembly of the substrate tape RS and composite material tape RM toward the application roller 49 through the two knurled rollers 47 during the unwinding of the assembly from the spool 35, or of the substrate tape RS alone toward the spool 35 during rewinding of the tape.

The different electric motors associated with the draping head 17 allow the driving of a spool 35, the knurled rollers 37 and the pivoting to the plate 45 forming the guide corridor are controlled in a synchronized and coordinated manner by the digital controller 41. Alternatively, it is possible to provide a single electric motor that, via a suitable driving mechanism, can drive the spool 35 and the two knurled rollers 47.

Furthermore, the application roller 49 of the draping head 17 also has a compacting function for the assembly of the substrate tape RS and composite material tape RM on a portion of the elongate mold 3 or on a portion of a composite material layer previously deposited.

Advantageously, the composite material tape RM attached to the substrate tape RS is precut on a length substantially equal to the length of the elongate mold 3 from which a stiffener must be made.

A draping and compacting sequence or cycle of a composite material layer on the elongate mold 3 will be described in reference to FIGS. 6A to 6E and 7 in the case of a mold 3 having a hat-shaped profile for producing a stiffener with a conjugated profile.

The first phase of this cycle consists first, in a position of the table 1 outside the gantry 11, of fixing the mold on the heating plate 2 secured to the table 1 so that the mold is heated and brought to a predetermined temperature.

Figure 6A:
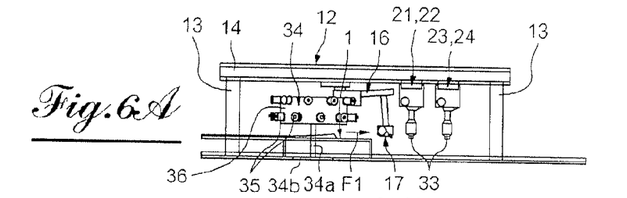
FIG. 6A to 6E shows the inventive device at different steps in the manufacture of an elongate composite material part.
Figure 6B:
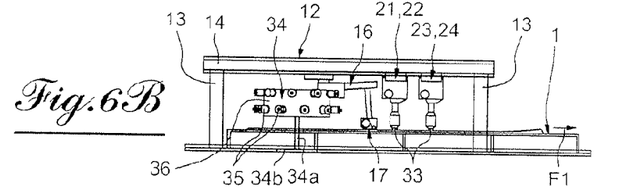
Figure 7:
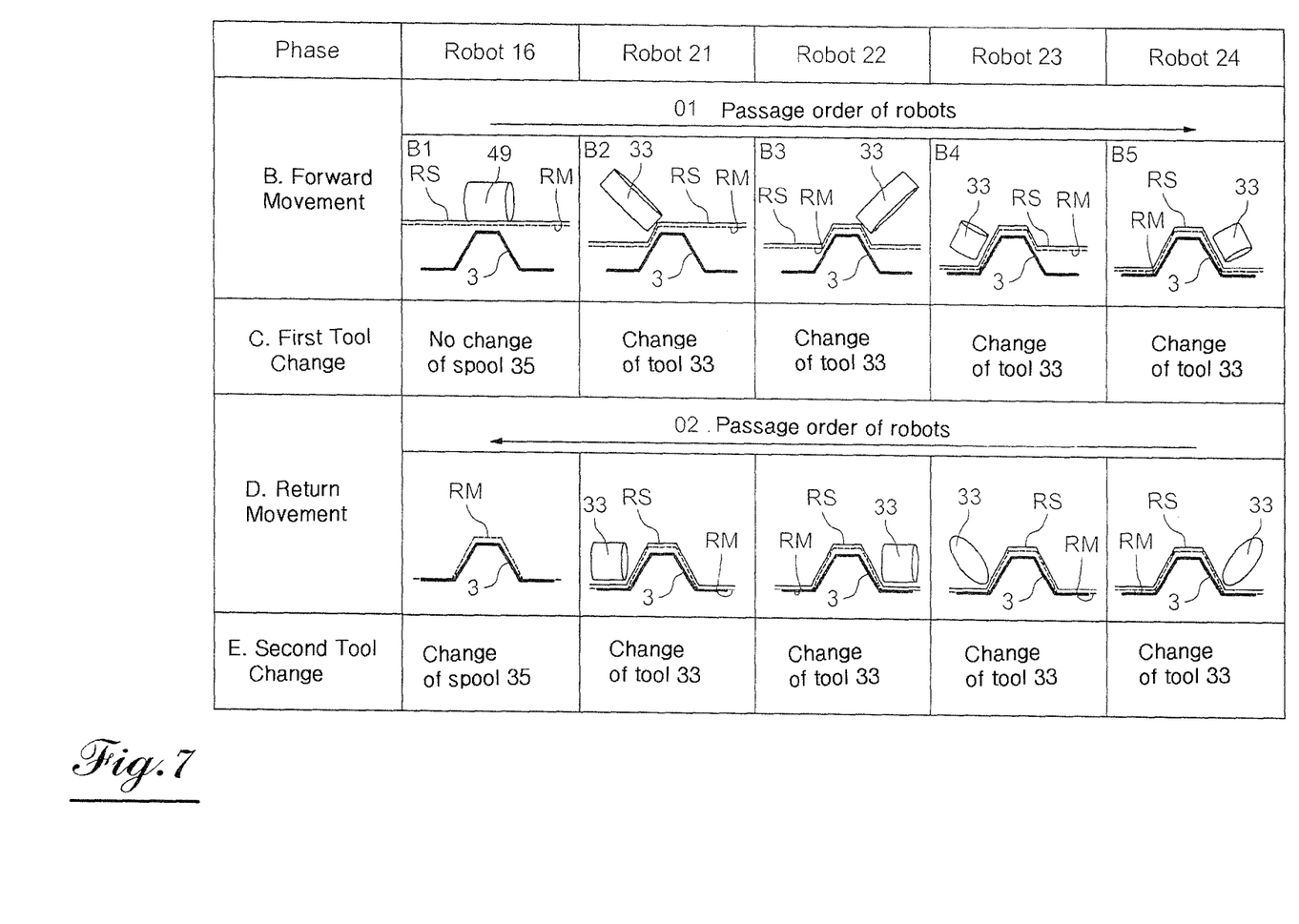
FIG. 7 diagrammatically illustrates the position of the tools for a complete draping and compacting cycle of an elongate part with a hat-shaped profile.

The second phase of the cycle, shown in FIGS. 6A, 6B and in B of FIG. 7, consists of controlling the electric motor 8 of the table 1 to translate the latter via the pinion and rack assembly 5, 6 in the direction indicated by the arrow F1 so that the mold 3 can pass under the gantry 11 and successively under the robot 16 carrying the draping head 17 and the different robots 21 to 24 carrying different forming and compacting tools 33 following the passage order of the robots indicated by 01 in FIG. 7. More specifically, when the mold 3 passes under the draping head 17 positioned beforehand by the robot 16, the draping head 17 deposits, on the planar upper surface of the mold 3, a first assembly of the substrate tape RS and composite material tape RM by unwinding the assembly via rotation of the spool 35 by its drive motor in the direction coordinated with the direction of displacement of the table 1 following arrow F1, with the application roller 49 of the head 17 compacting the assembly on the upper planar surface of the mold 3 along the latter as shown in B1 in FIG. 7. Then, during passage of the mold 3 under the different tools 33 carried by the robots 21 to 24 and in the passage order O1 of the robots, the assembly with tapes RS and RM deposited on the upper surface of the mold 3 is formed and compacted on a portion of the mold 3 as shown in B2, B3, B4 and B5 of the forward displacement in direction F1 of the table 1. Thus, as shown in B2 for the forward movement of phase B, the tool 33 carried by the robot 21 performs the forming and compacting of the assembly of the tapes RS and RM on one of the upper corners of the hat-shaped profile of the mold 3 along the latter then, as shown in B3, the tool 33 of robot 22 compacts the assembly by applying pressure on the opposite upper corner of the hat-shaped profile of the mold 3 along the latter. Then, as shown in B4, the tool 33 carried by robot 23 performs compacting by pressure of the assembly of tapes RS and RM on one of the oblique sides of the hat-shaped profile of the mold 3 along the latter and, as shown in B5, the tool 33 carried by robot 24 performs the compacting by pressure of the assembly on the opposite inclined side of the mold 3 along the latter. Of course, the robots 21 to 24 have been controlled by the digital controller 41 to position the different tools 33 relative to the elongate mold 3 in the manner shown in B2, B3, B4 and B5. Thus, when the mold 3 has passed under the last robot 24, the set of tapes RS and RM is shaped and compacted all along the mold on the upper surface and the two opposite sides of the hat-shaped profile of the mold as shown in B5 of FIG. 7.

Figure 6C:
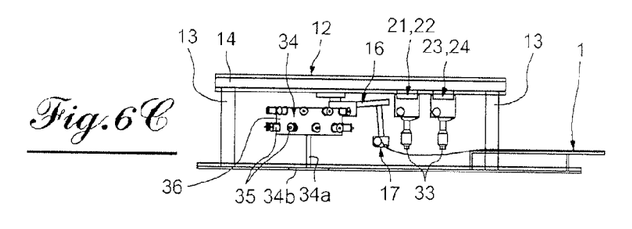

According to the third phase of the cycle, once the table 1 and the mold 3 have completely passed under the gantry 11 and the assembly of the tapes RS and RM has been deposited on the mold 3 as shown in FIG. 6C, the displacement of the table 1 is stopped. At that time, the digital controller 41 controls the robots 21 to 24 so they change compacting tools as indicated by phase C in FIG. 7 by making them first deposit the preceding compacting tools in the corresponding unit 40 and grasping, from unit 40, the new compacting tools, automatically. FIG. 6C shows that up to the edge of the table relative to the gantry 11, the draping head 17 has continued to unwind the substrate tape RS from its spool 35 beyond the mold 3, the composite material tape having been deposited on the entire length of the mold 3 since it is precut to the length of the mold, in order to be able to rewind the substrate tape RS during the return movement of the table 1 in direction F2 opposite the preceding direction F1.

Figure 6D:
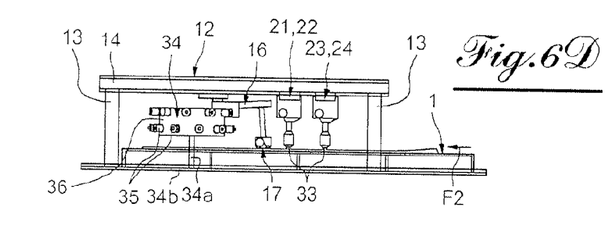
Figure 6E:
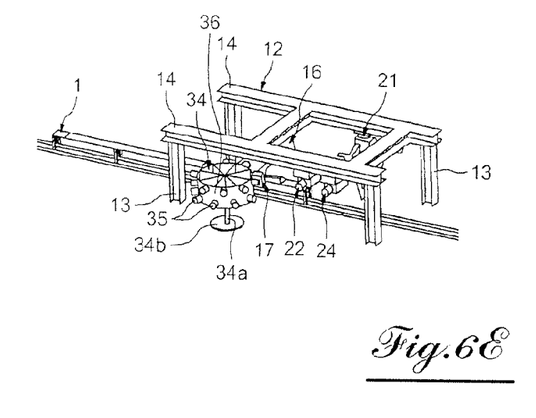

The following step of the draping and compacting cycle consists of controlling, via the digital controller 41, the movement of the table 1 under the gantry 11 in the direction of the arrow F2 opposite the preceding direction F1 and positioning the robots 21 to 24 as well as their new compacting tools 33 relative to the mold 3 so as to make the assembly of substrate RS and composite material RM tapes previously partially compacted pass successively under the robots 24 to 21 in the passage order 02 indicated in phase D of the return movement of the table 1 in FIG. 7. In this way, the new compacting tools 33 of these robots perform the compacting of the assembly of substrate and composite material tapes RS and RM on the opposite lower corners and on the opposite side walls of the base of the hat-shaped profile of the mold 3 all along the latter. Furthermore, when this assembly passes under the draping head 17 previously positioned relative to the mold 3 by the robot 16 controlled by the digital controller 41, the spool 35 of draping head 17 is driven by its motor, also controlled by the digital controller 41 in the direction ensuring the rewinding, synchronized with the displacement of the table 1, of the substrate tape RS around the spool 35, the tape being separated by peeling of the composite material layer of the mold 3 compacted on the mold to fit the hat-shaped profile thereof These steps for compacting the assembly of the substrate RS and composite material RM tapes by the tools 33 of the robots 24 to 21 and rewinding the substrate tape RS on the spool 35 of the draping head 17 are shown in FIG. 6D. The following phase of the draping and compacting cycle shown in FIG. 6E and in E of FIG. 7 is that where the table 1 is passed again under the gantry 11 and has returned to its initial position of FIG. 6A, in which the layer of composite material has been completely compacted over the entire length of the mold 3 to fit the profile thereof Furthermore, the robot 16 is controlled by the digital controller 41 in order to move the draping head 17 provided with its spool 35 on which the substrate tape RS has been completely rewound toward the carrousel 34 so that the draping head 17 can deposit the spool on a corresponding free axis of the carrousel and then grasp another spool with an assembly of the substrate and composite material tapes RS and RM to load the new spool into the draping head 17. At the same time, the robots 21 to 24 are controlled by the digital controller 41 so that they deposit, on the other unit 40, the compacting tools 33 used during phase D of the return movement of the table 1 and take back the compacting tools 33 used during the forward movement of phase B. Once these operations are performed, the device is ready to deposit and compact a new ply of composite material on the first ply previously deposited and compacted on the mold 3.

Phases B to E of the deposition and compacting cycle previously described are repeated for all of the material plies that must be deposited and compacted on each material ply previously deposited and compacted on the mold 3.

Once all of the plies are deposited and compacted on the mold 3, the latter is transferred to other work stations to perform the usual subsequent operations of the production cycle for stiffeners such as placement in vacuum, autoclave curing, etc.

As emerges from the preceding, each draping and compacting sequence for composite material plies on the corresponding mold is done completely automatically, the only manual operations being done upstream of the sequence in particular to prepare the spools for assemblies of the substrate tapes and material tapes RS and RM.

Furthermore, the draping head 17 is specially designed to ensure the complete automation of the draping and compacting sequences previously described. Thus, the draping head 17 performs the following function of depositing each pre-impregnated material tape with its substrate tape on the mold. In a traditional draping head, the pre-impregnated tape is first separated from its substrate tape using a separator before being placed on the mold. In the inventive draping head, the pre-impregnated tape is deposited with its substrate tape on the mold and the compacting by the compacting wheels or rollers 33 is done on the substrate tape and not directly on the pre-impregnated tape.

The draping head 17 performs the function of rewinding the substrate film or tape. Unlike a traditional draping tape, there is no device for cutting the pre-impregnated tape. In fact, once the table 1 has passed completely under the draping head 17 robot 16, the head continues, via its driving motor of the spool, to unwind only the substrate tape until the table has passed completely under the compacting robots 21 to 24. When the table is displaced in the opposite direction relative to the gantry 11, the spool 35 of the draping head 17 rewinds the substrate tape RS to ensure the gradual detachment by peeling of this composite material tape to be draped on the mold. This draping head design thus avoids any manual operation; and The draping head 17 performs the function of automatically loading the spools with substrate and composite material tapes in the draping head 17. In the manufacture process for each stiffener, there must be one spool per ply of composite material to be draped on the mold. It is therefore necessary to reload the draping head with a new spool with an assembly of the substrate tape and composite material tape before depositing and compacting the material ply on the mold. This operation is performed automatically so as not to interrupt this manufacture process with a manual operation, by storing the spools 35 in the carrousel 34, which thus contains all of the spools needed to manufacture a stiffener. As previously explained, the movement of this carrousel is steered by the digital controller 41, which allows the draping robot 16 to position itself at two locations of the carrousel, one for unloading each used spool and the other for loading each new spool in the draping head. The draping head has the means previously described for unhooking and grasping the spools. During the unloading and loading operation of a spool, the plate 45 forming a guide corridor is controlled to pivot in one direction, releasing it completely from the provided location of the spool. Once a spool is unloaded from the draping head 17 and replaced with another, the plate 45 is brought into its position between the two flanges 37 of the new spool 35 so that, through controlled rotation of the spool 35 in the appropriate direction, the beginning of the assembly of the substrate tape and composite material tape RS and RM can engage automatically in the corresponding end of the plate 35 forming the guide corridor to thereby automatically ensure the guiding of the assembly toward the application and compacting roller or wheel 49 of the draping head 17 through the knurled rollers 47.

Of course, the robotic device described above to manufacture composite material parts can be used to produce any type of part profiles, which can be straight or curved. Furthermore, the inventive device can also operate by moving the support gantry 11 of the draping and compacting robots relative to the stationary table.

This device for the automated manufacture of elongate composite material parts such as stiffeners has the following advantages:

simplified access to the support table of the mold, when the movement thereof is stopped;

an optimized draping and compacting cycle time owing to the use of the movements of the table and its mold in opposite directions during which the draping and compacting operations are done without dead time;

complete automation of the draping and compacting method owing to the rewinding of the substrate tape, automatic spool changing for the draping head and compacting tools; and adaptation of the device to the different geometries of the parts to be made, with the movements of the arms of the robots on different axes and the automatic changes of compacting tools, device which can thus be adapted to a wide range of parts that differ through the shape of their sections (C, T, delta, hat shape, Z, etc.) and by the overall geometry of the parts.

Furthermore, this adaptation can be done quickly owing to the automatic tool changing means and the programming of the entire device by digital controller. This consequently amounts to a flexible manufacturing workshop that can be reconfigured very quickly in order to manufacture a wide range of different parts in an extremely reduced cycle time.

The invention claimed is:

1. A method for the automated manufacture of an elongated composite material part with at least one layer using a mold having a shape complementary to that of the elongated composite material part, the method comprising:
  a) depositing, by unwinding onto the mold, in a first direction, along the mold, a first assembly comprising a first composite material layer separably attached to a first substrate tape;
  b) forming and compacting a first part of the first assembly onto the mold in the first direction, partially shaping the first assembly to the shape of the mold;
  c) forming and compacting a second part of the first assembly in a second direction, opposite the first direction, shaping the first assembly completely to the shape of the mold; and
  d) separating, by peeling, the first substrate tape from the first composite material layer, which is secured to the mold, by rewinding the first substrate tape in the second direction.

2. The method according to claim 1, wherein
  b) comprises forming and compacting the first part of the first assembly on the mold by passing a compacting tool having a shape partially complementary to the shape of the mold over the first part of the first assembly, in the first direction, and
  c) comprises forming and compacting the second part of the first assembly on the mold by automatically replacing the compacting tool with a different compacting tool partially complementary to the shape of the mold, and passing the different compacting tool over the second part of the first assembly, in the second direction.

3. The method according to claim 2, comprising:
  unwinding the first assembly from a first spool removably fastened to a draping head during movement between the draping head and the mold in the first direction, the draping head comprising a roller for application to the first assembly on the mold; and
  rewinding the first substrate tape on the first spool during movement between the draping head and the mold in the second direction.

4. The method according to claim 3, comprising:
  automatically replacing the first spool fastened to the draping head, on which the first substrate tape is rewound, with a second spool on which a second assembly, comprising a second composite material layer separably attached to a second substrate tape, is wound;
  automatically replacing the different compacting tool with the compacting tool; and
  repeating a) through d) using the second assembly to deposit the second composite material layer on the first composite material layer that is secured to the mold.

5. The method according to claim 1, including heating the mold before performing a) through d).

6. The method according to claim 4, including:
  longitudinally displacing the mold under a fixed gantry supporting at least two actuators movable with plural degrees of freedom, wherein the actuators comprise:
  a first actuator including the draping head; and
  a second actuator including the compacting tool, which is removably fixed to the second actuator and used to form and compact each first assembly on the mold, in the first direction, and which is replaced by the different compacting tool to form and compact the first assembly on the mold, in the second direction.

7. The method according to claim 6, including moving the first actuator toward a carrousel to automatically deposit the first spool, on which the first substrate tape is rewound, onto the carrousel and to selectively withdraw the second spool stored on the carrousel and on which the second assembly is wound.

8. The method according to claim 6, wherein the actuators comprise robots.

9. The method according to claim 1, wherein
  the first assembly is one of a plurality of assemblies, each assembly comprising a composite material layer separably attached to a substrate tape, and
  each composite material layer is precut to length substantially equal to length of the mold.

10. The method according to claim 1, wherein the mold has, in transverse section, one of a T shape, a hat shape, a C shape, an I shape, an L shape, and a Z shape.

11. The method according to claim 7, including sequentially controlling, in a synchronized manner, through a digital controller deposition, formation, and compacting of each first assembly,
  changes of compacting tools and spool of the draping head, and
  displacement of the mold relative to the draping head and the compacting tools.

12. A device for the automated manufacture of an elongated composite material part with at least one layer, the device comprising:
- a table;
- a mold positioned on the table and having a shape complementary to an elongated composite material part to be made;
- a gantry supporting at least two actuators with plural spatial degrees of freedom, wherein
    - a first actuator of the actuators includes a draping head for depositing a composite material layer separably attached to a substrate tape on the mold, and
    - a second actuator of the actuators includes a first compacting tool removably fixed to the second actuator and used to form and compact the composite material layer separably attached to the substrate tape deposited on the mold; and
- a displacement unit for relative guided displacement between the table and the gantry in a longitudinal direction of the mold, wherein
    - the second actuator is controlled to replace the first compacting tool with a second compacting tool after forming and compacting the composite material layer separably attached to the substrate tape deposited on the mold, by relative displacement between the mold and the first compacting tool in a first direction, and
    - the second actuator is controlled to replace the first compacting tool with the second compacting tool before relative displacement between the mold and the second compacting tool in a second direction, opposite the first direction, to form and compact the composite material layer separably attached to the substrate tape deposited on the mold.

13. The device according to claim 12, wherein the draping head comprises:
- a spool removably fixed to the draping head and rotatable in a plurality of directions by a spool motor, wherein an assembly of the composite material layer separably attached to the substrate tape is wound on the spool and is unwound from the spool when the spool is rotated in different respective directions by the spool motor; and
- a roller that deposits the assembly on the mold when the assembly is unwound from the spool rotating in a first direction and the table is displaced relative to the gantry in the first direction, wherein the spool is rotated in a second direction, opposite the first direction, by the spool motor to rewind the substrate tape and separate the substrate tape from the composite material layer deposited on the mold, when the table is displaced relative to the gantry in the second direction.

14. The device according to claim 13, wherein the draping head comprises:
- a hollow plate positioned near the spool and forming a guide corridor for guiding the assembly toward the roller when the assembly is unwound from the spool and for guiding the substrate tape toward the spool during rewinding of the substrate tape; and
- two knurled motorized guide rollers positioned between the hollow plate and the roller.

15. The device according to claim 14, wherein
the hollow plate is funnel shaped and has a large opening located adjacent to the spool,
the hollow plate is pivotably mounted, relative to the draping head, between a released position for fastening the spool to the draping head, and a guide position, and
the device includes a plate motor controlling pivoting of the hollow plate.

16. The device according to claim 15, comprising a storage carrousel positioned near the gantry and supporting a plurality of spools, wherein
each spool comprises an assembly of a composite material layer separably attached to a substrate tape that is wound around the spool, before the spool is used, and the first actuator is controlled to grasp and removably fix a selected one of the plurality of spools from the storage carrousel to the draping head.

17. The device according to claim 16, wherein
the device includes a draping head motor,
each of the spools comprises a tapered nozzle integral with a support axis of the spool, and
the draping head comprises a tapered spindle rotatably mounted to the draping head, controlled by the draping head motor, and to which the tapered nozzle is removably coupled.

18. The device according to claim 12, comprising:
- a plurality of storage and compacting tool units located near the gantry; and
- a plurality of compacting tools stored at the plurality of storage and compacting units, wherein the at least two actuators are controlled to automatically deposit one of the plurality of compacting tools at one of the plurality of storage and compacting units and to grasp another one of the plurality of compacting tools in the storage and compacting unit.

19. The device according to claim 12, wherein the gantry is fixed and the displacement unit displaces the table in guided translation under the gantry in the longitudinal direction of the mold.

20. The device according to claim 19, wherein the displacement unit comprises:
- a motorized pinion integral with the table;
- a fixed rack extending parallel to the longitudinal direction of the mold and engaging the motorized pinion; and
- at least one fixed guide rail parallel to the fixed rack and on which the table is displaceable.

21. The device according to claim 12, further comprising a heating plate positioned on the table, wherein the mold is positioned on the heating plate.

22. The device according to claim 12, wherein the actuators comprise robots with articulated wrists that carry the draping head, the first compacting tool, and the second compacting tool.

23. The device according to claim 17, comprising a digital controller that controls
the draping head and the actuators in a synchronized and coordinated manner,
the relative guided displacement between the table and the gantry,
a change of the first compacting tool for the second compacting tool,
a change of the plurality of spools in the draping head, and
the spool motor, the plate motor, and the draping head motor.

* * * * *